US012591376B2

(12) United States Patent
Sharma et al.

(10) Patent No.: US 12,591,376 B2
(45) Date of Patent: Mar. 31, 2026

(54) METHOD AND DEVICE FOR SECURING USER DATA ON A DATA STORAGE DEVICE

(71) Applicant: Sandisk Technologies, Inc., Milpitas, CA (US)

(72) Inventors: Ravi Dutt Sharma, Bengaluru (IN); Ashish Jaiswal, Bengaluru (IN); Uma Sachdeva, Bengaluru (IN); Tusarkanta Champatiray, Bengaluru (IN); Yogendra Singh Sikarwar, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 50 days.

(21) Appl. No.: 18/747,422

(22) Filed: Jun. 18, 2024

(65) Prior Publication Data

US 2025/0383787 A1 Dec. 18, 2025

(51) Int. Cl.
*G06F 3/06* (2006.01)

(52) U.S. Cl.
CPC .......... *G06F 3/0622* (2013.01); *G06F 3/0655* (2013.01); *G06F 3/0673* (2013.01)

(58) Field of Classification Search
CPC ..... G06F 3/0622; G06F 3/0655; G06F 3/0673
See application file for complete search history.

(56) References Cited

U.S. PATENT DOCUMENTS

| | | | | |
|---|---|---|---|---|
| 8,538,332 | B2 * | 9/2013 | Huomo .............. | G06Q 20/3278 |
| | | | | 370/401 |
| 11,782,621 | B2 * | 10/2023 | Klapman ................ | G06F 3/064 |
| | | | | 711/154 |
| 12,353,765 | B2 * | 7/2025 | Muthiah ................ | G06F 3/0659 |
| 2022/0417024 | A1 * | 12/2022 | Yee ........................ | H04L 9/3234 |
| 2023/0289089 | A1 * | 9/2023 | Mastenbrook ........ | G06F 3/0671 |

OTHER PUBLICATIONS

Apple Support, "Mark a device as lost in Find My on iPhone", retrieved online, URL: https://support.apple.com/en-GB/guide/iphone/iph7cc193cfc/ios#:~:text=In%20order%20to%20mark%20a,%5Bdevice%5D%20before%20it's%20lost, accessed on Jun. 19, 2024.

(Continued)

*Primary Examiner* — Zhuo H Li
(74) *Attorney, Agent, or Firm* — Patent Law Works LLP

(57) ABSTRACT

A data storage device comprises a data port configured to transceive data between a data source and the data storage device, a non-volatile storage medium, configured to store encrypted user data, and a wireless communication port, configured to wirelessly transceive data between a server application and the data storage device. In response to the operational status of the data storage device being locked, transmit, via the wireless communication port, a security status enquiry message to a server application. Receive, via the wireless communication port, from the server application, a security status of the data storage device, the security status indicating whether the data storage device is registered as being secured or unsecured. Receive, via the data port, an unlock request and, in response to the security status indicating that the data storage device is secured, transition the operational status of the data storage device from a locked state to an unlocked state.

20 Claims, 7 Drawing Sheets

(56) References Cited

OTHER PUBLICATIONS

Apple Support, "Erase a device in Find My on iPhone", retrieved online, URL: https://support.apple.com/en-gb/guide/iphone/iph21a030ae3/ios, accessed on Jun. 19, 2024.

Yadav, Sanjeev, Remote Wiping Software to Erase Data From Drives, PCs, Laptops & Servers, Apr. 25, 2024, retrieved online, URL https://www.bitraser.com/blog/remote-wiping-software/#:~:text=Remote%20Wiping%20is%20a%20feature,%2C%20desktops%2C%20and%20drives%20remotely, accessed on Jun. 19, 2024.

* cited by examiner

METHOD AND DEVICE FOR SECURING USER DATA ON A DATA STORAGE DEVICE

TECHNICAL FIELD

Aspects of the disclosure relate generally to data storage devices and, more specifically, to systems and methods for providing privacy and security for user data stored on a data storage device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a master device (such as a host computing system or a mobile user device) with an additional portion of non-volatile memory (i.e., the volume of the drive) in which to store digital data. These external drive type devices are connectable to a master device via a data path operating over a particular wireless or wired connectivity protocol (e.g., via Universal Serial Bus (USB) cable). In response to being connected to a master device, the master device recognizes the external drive as a block data storage device such that a user of the device may access the storage of the drive via the data path (e.g., through operation of the master device). Access to the drive typically enables a user to access (e.g., read, write and/or modify) user data stored on the drive.

A user may use a DSD to store user data that is proprietary, confidential, important or otherwise sensitive. In the event that the DSD is lost, stolen or otherwise misplaced, there may be a risk that an unauthorized party is able to access the user's proprietary, confidential, important or otherwise sensitive data stored on the DSD.

It is therefore desired to provide a data storage device that ameliorates one or more of these difficulties, or other difficulties, of the prior art or that at least provides a useful alternative.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY

Provided herein is a means to confirm the registered security status of a DSD before the DSD is unlocked for a user to perform read or write operations on the storage medium of the DSD. A user can register the security status (e.g. either secured or unsecured), with a server application.

The DSD is configured to wirelessly enquire of the server application the registered security status of the DSD. In response to the registered security status of the DSD being 'secured', and in response to receiving an unlock request from an authorized user, the DSD is configured to transition from a locked state to an unlocked state. In response to the registered security status of the DSD being 'unsecured' the DSD may be configured to perform a data erase operation and/or a data backup operation to provide data security.

In accordance with an aspect of the present disclosure, there is provided a data storage device comprising: a data port configured to transceive data between a data source and the data storage device; a non-volatile storage medium, configured to store encrypted user data; a wireless communication port, configured to wirelessly transceive data between a server application and the data storage device; and one or more processors. The one or more processors are, individually or in combination, configured to, in response to the operational status of the data storage device being locked: transmit, via the wireless communication port, a security status enquiry message to a server application; receive, via the wireless communication port, from the server application, a security status of the data storage device, the security status indicating whether the data storage device is registered as being secured or unsecured; receive, via the data port, an unlock request; and in response to the security status indicating that the data storage device is secured, transition the operational status of the data storage device from a locked state to an unlocked state.

In some embodiments, the one or more processors, individually or in combination, are further configured to, in response to the security status indicating that the data storage device is unsecured, and in response to receiving, via the data port, an unlock request, maintain the operational status of the data storage device as locked.

In some embodiments, receiving, from the server application, a security status comprises receiving one or more security commands indicating actions to be taken by the data storage device in response to the security status indicating that the data storage device is unsecured.

In some embodiments, the one or more security commands comprises an erase command. In some embodiments, in response to receiving the erase command, the one or more processors, individually or in combination, are further configured to erase secured user data from the storage medium. In some embodiments, the erase command comprises an indication of the secured user data.

In some embodiments, the secured user data comprises one or more of: one or more data files stored in the storage medium; one or more data files in a folder stored in the storage medium; all user data stored in a partition of the storage medium; all user data stored in a logical unit number of the storage medium; and all user data stored in the storage medium.

In some embodiments, the one or more security commands comprises a backup command. In some embodiments, in response to receiving the backup command, the one or more processors, individually or in combination, are further configured to transmit, via the wireless communication port, secured user data stored in the storage medium. In some embodiments, the backup command comprises an indication of the secured user data. In some embodiments, the secured user data is transmitted as encrypted data.

In some embodiments, transmitting, via the wireless communication port, the security status enquiry message to the server application comprises, in response to a security status update event, transmitting, via the wireless communication port, the security status enquiry message to the server application.

In some embodiments, the security state update event comprises one or more of: the data storage device connecting to a wireless network; the data storage device turning on from an off state; a user interface of the data storage device being activated; and a trigger of an internal timer of the data storage device.

In some embodiments, the one or more processors, individually or in combination, are further configured to, in response to the occurrence of a security event, transition the operational status of the data storage device to locked.

In some embodiments, the security event comprises one or more of: the data storage device experiencing a loss of power; the data storage device experiencing a depleted battery; the data storage device experiencing a loss of wireless connectivity on the wireless communication port; the data storage device experiencing a loss of wireless connectivity to the server application; and the data storage device receiving a security status update message from the server application.

In some embodiments, transmitting a security status enquiry message comprises establishing a wireless communication between the data storage device and the server application.

In some embodiments, in response to the operational status of the data storage device being unlocked, the one or more processors, individually or in combination, are further configured to: receive, via the data port, user data; and write the user data to the storage medium.

In some embodiments, in response to the operational status of the data storage device being unlocked, the one or more processors, individually or in combination, are further configured to: receive, via the data port, a request to read user data stored in the storage medium; and transmit, via the data port, the user data.

In some embodiments, in response to the operational status of the data storage device being locked, and in response to receiving, via the data port, a read request or a write request, the one or more processors, individually or in combination, are further configured to transmit an error message via the data port.

In accordance with another aspect of the present disclosure, there is provided a method for unlocking a data storage device. The data storage device comprises: a data port configured to transceive data between a data source and the data storage device; a non-volatile storage medium, configured to store encrypted user data; and a wireless communication port, configured to wirelessly transceive data between a server application and the data storage device. The method comprises, in response to the operational status of the data storage device being locked: transmitting, via the wireless communication port, a security status enquiry message to a server application; receiving, via the wireless communication port, from the server application, a security status of the data storage device, the security status indicating whether the data storage device is registered as being secured or unsecured; receiving, via the data port, an unlock request; and in response to the security status indicating that the data storage device is secured, transitioning the operational status of the data storage device from a locked state to an unlocked state.

In accordance with another aspect of the present disclosure, there is provided a device for unlocking a data storage device. The device comprises: means to transmit a security status enquiry message to a server application; means to receive from the server application, a security status of the data storage device, the security status indicating whether the data storage device is registered as being secured or unsecured; means to receive an unlock request; and means to in response to the security status indicating that the data storage device is secured, transition the operational status of the data storage device from a locked state to an unlocked state.

BRIEF DESCRIPTION OF DRAWINGS

The embodiments of the disclosure will now be described with reference to the accompanying drawings, in which:

FIG. 2 is a state diagram illustrating some of the operational states of the DSD, in accordance with an embodiment;

DESCRIPTION OF EMBODIMENTS

Figure 1:
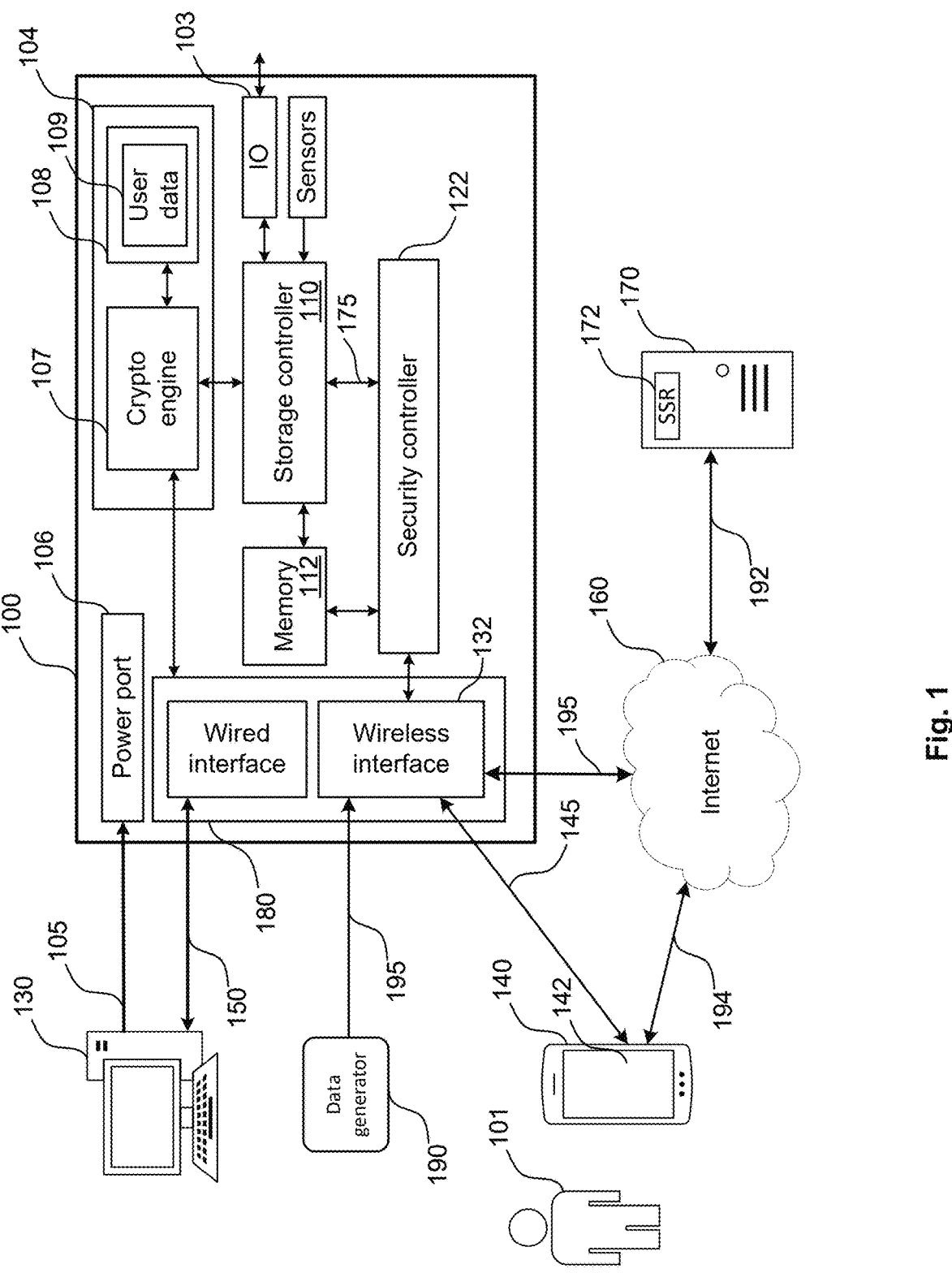
FIG. 1 illustrates a data storage device, in accordance with an embodiment.

FIG. 1 illustrates a data storage device (DSD) 100, in accordance with an embodiment. The DSD 100 comprises a data path 104 and a storage controller 110. The data path 104 comprises a data port 180 configured to transceive (e.g. transmit, or receive, or both transmit and receive) data between a master device and the DSD 100. In some embodiments, the data port comprises a wired interface. In some embodiments, the data port comprises a wireless interface. In some embodiments, the data port comprises a wireless interface and a wired interface.

The master device may comprise a host computer system 130, with which the DSD is configured to transceive data via the wired interface and the wired communication channel 150. Alternatively, or additionally, the master device may comprise a user device 140, with which the DSD is configured to transceive data via wireless communication channel 145.

In response to being connected to the host computer system 130, the DSD 100 is configured to register with the host computer system such as to provide functionality to the host computer system of a mass storage device (e.g. a block data storage device). Similarly, in response to being connected to the user device 140, the DSD 100 may be configured to register with the host computer system such as to provide functionality to the host computer system of a mass storage device (e.g. a block data storage device).

DSD 100 comprises storage medium 108 configured to store user data 109. The user data 109 comprises one or more blocks of data organized into one or more user files, in accordance with a particular file system operable by the host computer system 130. In examples, the user files may comprise images, documents, videos etc.

The storage medium 108 is non-volatile such as to retain the stored user data irrespective of whether the medium 108 is powered. In embodiments, the medium 108 may comprise, a hard disk drive (HDD) with a rotating magnetic disk, a solid state drive (SSD) or its variations like Single Level Cell (SLC), Enterprise Multi Level Cell (eMLC), Multi-Level Cell (MLC), Triple Level Cell (TLC), and Quadruple Level Cell (QLC), and combinations of the above such as SSHD. Any other type of non-volatile storage media may also be used, including emerging non-volatile memory such as Program in Place or Storage Class Memory, such as ReRam, Phase Change Memory (PCM), and magnetoresistive random-access memory (MRAM). Further, the storage medium 108 may be a block data storage device, such that the user data 109 is written in blocks to the storage medium 108 and read in blocks from the storage medium 108.

The storage medium 108 may be further configured to store application data, which is used by the storage controller 110. For example, application data may comprise software instructions that are executable by the controller, log files, configuration parameters and other data not intended for use by a user.

Host Computer System

The host computer system 130 comprises one or more processing components. In one embodiment, the host computer system 130 comprises a personal computer, such as a desktop computer or a laptop computer. The host computer system 130 comprises a device driver which is configured to communicate with the DSD 100 over wired communication channel 150. The DSD 100 is configured to receive and transmit data to the host computer system 130, over wired communication channel 150, via data port 180. Accordingly, wired communication channel 150 may be referred to as data channel 150, as this channel supports the transfer of user data between the host computer and the DSD.

In response to the DSD connecting to the host computer system, an application on the host computer system and the controller 110 of the DSD perform a discovery process to provide the host application with information regarding the DSD and the storage medium 108.

The format and content of the messages communicated between the host application and the controller depend upon the communication protocol by which these two entities are configured to communicate.

In response to the controller 110 determining that the user is authorized to access the user data stored in the storage medium, the controller transmits configuration information to the host application. The configuration information comprises information (such as file structure, files and sizes) regarding the user data stored in the storage medium. The configuration information may also comprise access permission information regarding the user's access permissions. The host application indicates the configuration information via a graphical user interface, so that the user can access the user data stored in the storage medium.

Power Interface

In the embodiment illustrated in FIG. 1, the DSD 100 further comprises a power port 106 which is configured to receive electrical power via power interface 105. The power interface 105 may be electrically connected to the host computer system 130, such that the host computer system 130 is a power source and the power port 106 receives power from the host computer system. In another embodiment, the power interface 105 is electrically connected to a component other than the host computer system 130. The power interface 105 may comprise a wired electrical connection to a power source. The power interface 105 may comprise a wireless electrical connection to a power source.

The power port 106 and the wired interface of the data port 180 may be implemented collectively as, for example, some form of USB port (e.g., USB-A, USB-8, USB-C, mini-USB, micro-USB, etc.), a Thunderbolt port, a Power over Ethernet (PoE) port, or a similar port. In one embodiment, the power interface 105 comprises a USB interface which is configured to supply typically 5 V at 500 mA or higher currents.

In one embodiment, the power interface 105 comprises a wireless charging interface. The wireless charging interface may utilize electromagnetic induction to provide electrical power to the DSD 100. In one embodiment, the power interface 105 electrically connects the DSD 100 to the host computer system 130. In another embodiment, the power interface 105 electrically connects the DSD 100 to a power source that is not part of the host computer system 130. In one embodiment, the DSD 100 consumes power from the power interface 105 to operate the electronic circuitry of the DSD 100.

User and User Device

FIG. 1 further illustrates a user 101 of the DSD 100. The user 101 utilizes a user device 140, which may comprise a mobile phone, laptop, personal computer, or other device capable of communication with the DSD 100 via wireless communication channel 145. The user device 140 and user 101 may be authorized to control the operation of the DSD 100. In such case, the user device 140 is referred to as an authorized user device 140.

In the example illustrated in FIG. 1, the user device 140 is controlled by software, referred to as user application 142, which is configured to execute on one or more processors of the user device to implement the operations described as being performed by the user device.

Storage Controller

The DSD 100 further comprises a storage controller 110 (also referred to as the controller). The storage controller 110 may be comprised of one or more processors. A processor may comprise one or more microprocessors, microcontrollers or controlling circuitry. The one or more processors of the storage controller 110 are, in combination or individually, configured to execute program code stored within the system memory 112 to issue commands for controlling the operation of the DSD 100.

The system memory 112 stores device specific data, including at least a unique identifier of the DSD 100, referred to as the device identity key (IDK). The system memory 112 may further store configuration information which defines the function of the DSD 100. The DSD 100 may receive configuration information from the user 101 via the user device 140, and store the configuration information in the system memory 112.

The function of the storage controller 110 includes, but is not limited to, controlling data transmission through data path 104, and controlling operation of the cryptography engine to perform the encryption or decryption of the user data 109 by cryptography engine 107.

Security Controller

The DSD 100 further comprises a security controller 122. The security controller may be comprised of one or more processors, microprocessors, microcontrollers or controlling circuitry. The security controller is configured to execute program code stored within the system memory 112 to liaise with one or more authorized user devices via wireless communication channels such as channel 145, and to issue commands to the storage controller 110 for controlling the security operations of the DSD 100.

The storage controller 110 and the security controller 122 communicate via a bi-directional communication channel, referred to as side channel 175. Via side channel 175, the security controller provides commands to the storage controller to control the operational state of the DSD 100. Collectively, the storage controller 110 and the security controller 122 may be referred to as the controller.

Cryptography Engine

The DSD 100 includes a cryptography engine 107 configured to receive, interpret and execute commands received from a master device, such as host computer system 130, in accordance with a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine 107 is connected between the storage controller 110 and the storage medium 108 and is configured to use a cryptographic key to encrypt user data 109 to be stored on the storage medium 108, and to decrypt the encrypted user data 109 stored on the storage medium 108 in response to a request from the storage controller. The storage controller causes the cryptography engine 107 to control a cryptographic state of the user data 109 (i.e., encrypted or plain). In one mode of operation, the unencrypted data may pass through the data path 104 to the host computer system 130 via the data port 180. In some embodiments, the storage medium stores all user data in encrypted form.

In response to receiving, from a master device, a request to read user data stored in the storage medium, the controller instructs the cryptography engine 107 to decrypt the encrypted user data and transmit the plaintext user data to the master device.

IO Interface

The data storage device 100 may include an input/output (IO) interface 103. The IO interface 103 may include one or more input components configured to accept an input from the user 101. For example, the input components may include a set of buttons or a keypad, or a similar arrangement of mechanical components that collectively enable the selection of digits or characters for entering into the device 100.

The IO interface 103 may include one or more output components configured to indicate information to the user 101. For example, the output components may include a speaker, configured to emit audible signals, one or more visual indicators, such as a light or a display, configured to emit visual signals.

In one embodiment, the visual indicators include at least one operational state indicator configured provide the user 101 with an indication of whether the DSD is in a locked state or an unlocked state, as described further herein. In one embodiment, the visual indicators include at least one operational state indicator configured provide the user 101 with an indication of whether the DSD is in a secured state or an unsecured state, as described further herein.

DSD Enclosure

The DSD 100 includes an enclosure configured to physically house the components of the device 100. The enclosure is formed from a rigid, or semi-rigid, material with particular properties (e.g., electrical resistance and impact strength)

suited to protecting the internal components of device 100. For example, the material of the enclosure may include a polycarbonate (PC), an acrylonitrile butadiene styrene (ABS), an acrylic, a thermoplastic polyester, a metal, or a combination of any of these.

Wireless Interface

The wireless interface 132 comprises a wireless communication port, configured to wirelessly transceive control and data signals. The wireless interface may comprise one or more communication modules, such as a wireless modem, configured to receive and transmit data wirelessly via the transmission of an electronic message in a predetermined form. The wireless interface 132 of data port 180 of the DSD 100 is configured to search for, and connect to, a wireless network 195 within range of the DSD. Accordingly, the DSD can establish a wireless communication channel to the server application 170, via a proximate wireless network 195 and the internet 160. The internet 160 may comprise routers, DNS servers, proxy servers and other hardware and software to enable the DSD 100 to communicate with the server application 170.

In some embodiments, the wireless interface 132 is configured to automatically search for, and connect to, an available wireless network within range of the DSD. Responsive to the proximate wireless network not requiring credentials (e.g. a password), the DSD can proceed to establish a connection to the wireless network. The user 101 can use the user application 142 to preconfigure the DSD with the necessary credentials to access one or more wireless networks that require credentials.

The wireless interface 132 may be configured to operate in accordance with one or more wireless communication protocols, such as, but not limited to: Bluetooth; Bluetooth Low Energy (BLE); Zigbee; Wireless Fidelity (WiFi); WiFi Direct; Near Field Communication (NFC); Z-Wave; Global System for Mobile communication (GSM), Long-Term Evolution (LTE); Narrowband Internet of Things (NB-IoT); Long-Term Evolution Machine type communication (LTE-M); or a Low-Power Wide-Area Network (LPWAN) protocol such as 6LoWPAN.

Wireless Communication Channel

The DSD 100 is communicatively connected to the user device 140 via wireless communication channel 145. Communication channel 145 may comprise a wireless peer-to-peer communication channel configured to provide bi-directional communication directly between the user device 140 and the DSD 100 in accordance with a protocol, such as, but not limited to: Bluetooth; Bluetooth Low Energy (BLE); Zigbee; Wireless Fidelity (WiFi); WiFi Direct; Near Field Communication (NFC); Z-Wave; Global System for Mobile communication (GSM), Long-Term Evolution (LTE); Narrowband Internet of Things (NB-IoT); Long-Term Evolution Machine type communication (LTE-M); or a Low-Power Wide-Area Network (LPWAN) protocol such as 6LoWPAN.

In some embodiments, the DSD 100 is configured to act as a wireless bridge and generate a wireless fidelity (WiFi) network. The user device 140 can search for, and connect to the WiFi network generated by the DSD, to establish the wireless communication channel 145.

In embodiments, wireless communication channel 145 is used to transmit control signals from the authorized user device 140 and the DSD 100. The communication channel may also be used to transmit user data between the authorized user device and the DSD.

The user device may be communicatively coupled to remote servers and routers via wireless communication channel 195. However, the control channel 141 comprises a direct peer-to-peer communication channel. Advantageously, as the control channel 141 provides direct peer-to-peer wireless communication, communication via the control channel 141 is not dependent upon a router to transmit communication between the DSD 100 and the user device 140. Accordingly, it is not necessary to route communication from the authorized user device 140 to the DSD 100 via the internet, or via a router.

In the example illustrated in FIG. 1, the authorized user device 140 is a smart phone, and the control channel 141 is a Bluetooth connection. The user device 140 and the DSD 100 establish the communication channel 141 by pairing through the establishment of a Bluetooth connection. The Bluetooth connection forms a control channel 141 via which the authorized user device 140 and the DSD 100 can communicate.

Advantageously, embodiments described herein provide means for the user device to transfer data via the wireless peer-to-peer control channel 141 to be stored in the storage medium 108 of the DSD.

User Data Transmission

A data source transmits user data to the data storage device to be stored in the storage medium. A data source may comprise a master device such as host computer system 130 or user device 140. A data source may comprise a data generator 190, rather than comprising a master device.

A data sink receives user data transmitted from the storage medium of the data storage device. A device that is transmitting user data to the DSD, or receives user data from the DSD may be referred to as a master device.

The data storage device may receive user data from a plurality of data sources. In some embodiments, the host computer system 130 comprises a data source which may be configured to transmit user data to the DSD via data channel 150. The host computer system may also comprise a data sink, configured to receive user data from the DSD via data channel 150.

In some embodiments, the user device 140 comprises a data source which may be configured to transmit user data to the DSD via wireless communication channel 145. The user device may comprise a data sink, configured to receive user data transmitted by the DSD via wireless communication channel 145.

The DSD may receive user data from a data source such as data generator 190, and store the user data in the storage medium. In some embodiments, the data generator may comprise a camera generating video data, or sensor generating measured data. The data generator may be configured to transmit user data to the DSD via wireless communication channel 195.

Taking Ownership

In some embodiments, the first step in using DSD 100 after purchase, unpacking and power-up is to register a user device as an authorized user device of the DSD. For this process, the user device obtains a unique identifier of the DSD from the DSD. This unique identifier is referred to as the identity key (IDK). The identity key may be encoded (e.g. as a quick response (QR) code) affixed to an external surface of the DSD 100. A DSD controller application installed on the user device 140 has access to a camera and has a software module that extracts the encoded information from an image of the QR code. In another example, the user device 140 may read another tag or near field communication (NFC) chip affixed or integrated with DSD 100 to obtain the identity key.

Using that identity key, the user device can then initiate communication with the server application 170 to register the user device as a device that is authorized to control and transceive data with the DSD 100.

Security controller 122 creates authorization data that indicates that user device 140 is an authorized user device and stores the authorization data associated with a public key in configuration memory 112 to register the user device 140 as one of the multiple authorized user devices. A user can then use the authorized user device 140 to unlock the DSD 100 and read and write data to the storage medium of the DSD. Depending on configuration parameters, the user may be required to unlock the authorized user device 140 before DSD 100 can be unlocked.

User Device Software

The user device 140 is controlled by user application 142 that is configured to execute, individually or in combination, on one or more processors of the user device to implement the operations described as being performed by the user device. The user application 142 may comprise a plurality of software applications configured to execute on the user device. It will be appreciated that in embodiments in which the user device comprises a mobile phone, the user application may comprise a combination of an operating system and one or more applications installed on the user device.

In one embodiment, the user application 142 comprises a DSD controller application. The DSD controller application is configured to provide the user 101 with control of the operation of the DSD 100. The user 101 may use user application, via a user interface of the user device 140, to control the operation of the DSD 100.

Server Application

Both the DSD 100 and the user application 142 are configured to wirelessly communicate with the server application 170 via the internet 160. The server application 170 maintains a security status register (SSR) 172, which maintains a record of the security status of the DSD.

As detailed herein, the operational state and functionality of the DSD can be affected by the security status of the DSD. The user 101 can use the user application to report a change in security status of the DSD, and the DSD can enquire, of the server application, the security status of the DSD.

In an embodiment, the DSD can be in either a 'secured' state or in an 'unsecured' state. As used herein, the adjective 'unsecured' is used to describe a DSD that is no longer in the user's secure possession. This may include a DSD that has been: stolen by a known or unknown person, intentionally or otherwise; misplaced in a known or unknown location; unsecured from the user's physical or digital possession; located in an unknown location; or any circumstance where the user considers that they no longer have secure possession of the DSD. If the user has not reported the DSD as being 'unsecured', then the DSD is considered, by the server application, to be 'secured'.

The server application 170 maintains a security status register (SSR) 172, which comprises a SSR entry associated with the DSD 100. In some embodiments, the server application maintains a SSR entry for each of a plurality of data storage devices.

The SSR entry comprises information indicative of the security status of the DSD. The security status indicates one of two security states: either 'secured' or 'unsecured'. In some embodiments, the security status may indicate other security states, such as 'unknown' or 'unconfigured'.

The SSR entry may also comprises one or more security commands, which are instructions defining one or more actions to be taken by the DSD in response to the security status indicating that the DSD is 'unsecured'. The SSR entry may represent the security state and/or the security commands as a plurality of binary flags.

In some embodiments, the security commands may comprise instructions to: erase specific user data stored in storage medium 108; erase all user data stored in storage medium 108; transition the DSD into the LOCKED state 202; maintain the DSD in the LOCKED state 202; or any combination thereof.

States of the DSD

The DSD 100 may be in one of a plurality of operational states, wherein the operational states define how the DSD functions in response to various input stimuli. The operational state of the DSD 100 is maintained by the storage controller 110. The storage controller may transition the DSD from one operational state to another operational state in response to commands received by the security controller 122. In embodiments, the security controller provides command messages to the storage controller, via the side channel 175. The command messages are referred to as side channel messages (e.g. SCMs). The SCMs may cause the storage controller 110 to transition the operational state of the DSD from one state to another state.

Figure 2:
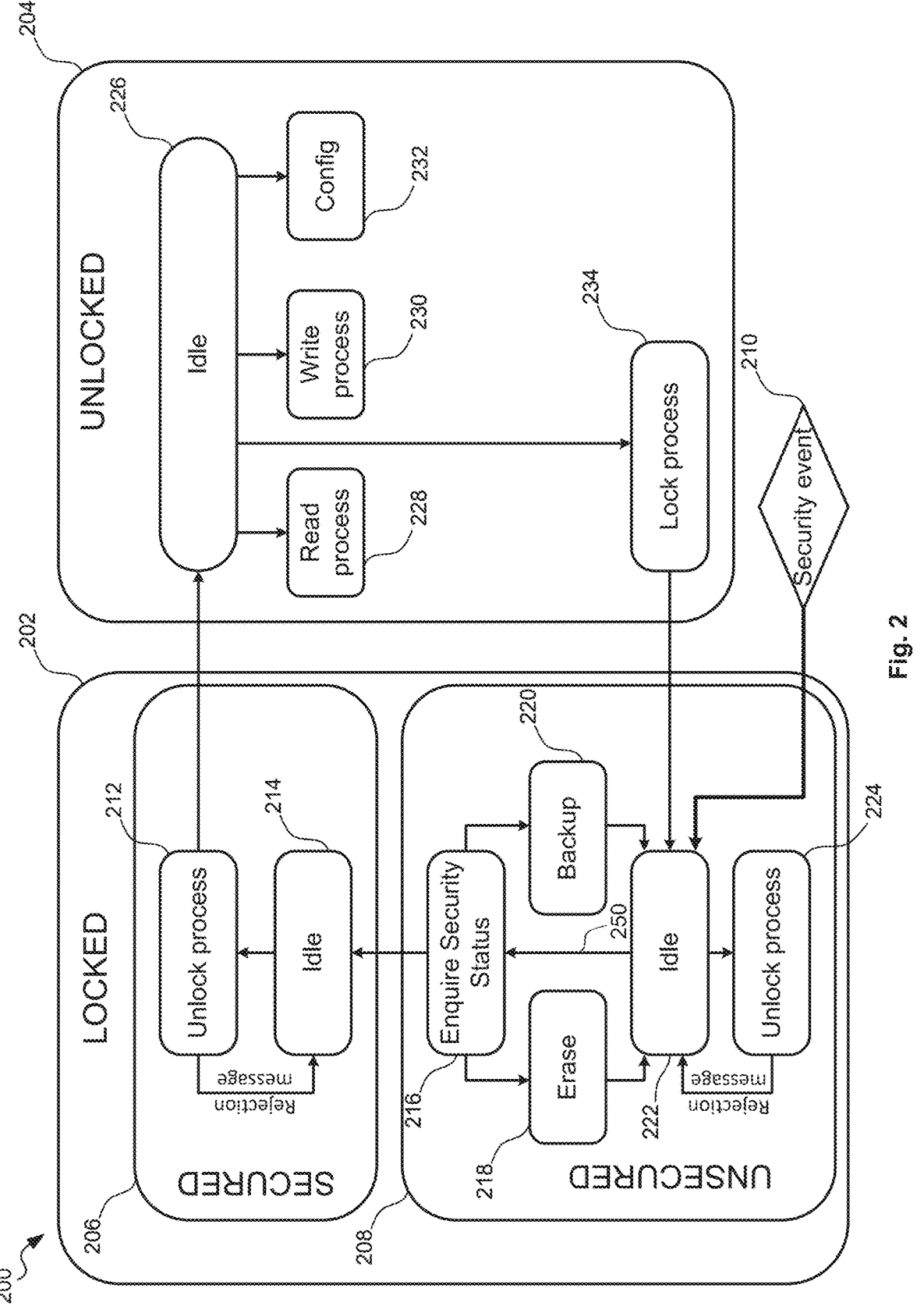
FIG. 2 illustrates a logical view of the storage medium, in accordance with an embodiment.

FIG. 2 is a state diagram 200 illustrating some of the operational states of the DSD 100, in accordance with an embodiment. In some embodiments, the DSD may be in an operational state not shown in FIG. 2. The operational states of the DSD are categorized into two primary states, either LOCKED 202 or UNLOCKED 204. Within each of these primary states, there are a number of operational states in which the DSD may operate.

In the LOCKED state 202 the DSD is configured to not provide access to the storage medium 108 to any other device, including user device 140 and host computer system 130. The state diagram also illustrates the UNLOCKED state 204, in which the DSD is configured to provide access to the storage medium via data channel 150 and/or via wireless communication channel 145.

The operational states within the LOCKED primary state are categorized into two security states, namely the SECURED state 206 and the UNSECURED state 208.

In the SECURED state 206, the DSD may sit in an idle state 214 until it receives an unlock request message from another device. For example, the DSD may receive an unlock request message from the host computer system 130 via data channel 150. In another example, the DSD may receive an unlock request message from the user device 140 via wireless communication channel 145. In response to receiving an unlock request message, the DSD transitions to the unlock process state 212, in which it attempts to perform an unlocking process, as described further herein.

In response to successfully completing the unlocking process 212, the DSD transitions to the UNLOCKED primary state 204, in which it remains idle until receiving a further command from a master device (such as the user device 140, or the host computer system 130).

In the INSECURED state 208, the DSD may sit in an idle state 222. In response to a security state update event 250 (as described further herein), the DSD is configured to transition to the enquire security status state 216, in which the DSD transmits a security status enquiry message 522 to the server application 170.

In response to receiving a security status update message 524 from the server application 170, indicating that the DSD is secured, the DSD transitions to the SECURED idle state 214. Alternatively, in response to receiving a security status update message from the server application, indicating that the DSD is unsecured, the DSD does not transition to the SECURED idle state 214. Rather, responsive to the security status update message not containing security commands, the DSD transitions to the UNSECURED idle state 222, and responsive to the security status update message containing one or more security commands (e.g. erase and/or backup), the DSD transitions to the erase state 218 and/or the backup state 220 in accordance with the one or more security commands.

In response to failing to transmit the security status enquiry message, or in response to failing to receive a security status update message from the server application 170, the DSD returns to the UNSECURED idle state 222.

In the UNLOCKED idle state 226, the DSD can transition to the read process state 228 in response to receiving a read request from another device. For example, the DSD may receive a read request message from the host computer system 130 via data channel 150. In another example, the DSD may receive a read request message from the user device 140 via wireless communication channel 145.

In the UNLOCKED idle state 226, the DSD can transition to the write process state 230 in response to receiving a write request from another device. For example, the DSD may receive a write request message from the host computer system 130 via data channel 150. In another example, the DSD may receive a write request message from the user device 140 via wireless communication channel 145.

In the UNLOCKED idle state 226, the DSD can transition to the configuration state 232 in response to receiving configuration information from another device. For example, the DSD may receive configuration information from the host computer system 130 via data channel 150. In another example, the DSD may receive configuration information from the user device 140 via wireless communication channel 145.

In the UNLOCKED idle state 226, the DSD can transition to the lock process state 234 in response to receiving a lock command from another device. For example, the DSD may receive a lock command from the host computer system 130 via data channel 150. In another example, the DSD may receive a lock command from the user device 140 via wireless communication channel 145.

The lock process causes the DSD to transition to the UNSECURED idle state 222. Advantageously, to transition the DSD back to the UNLOCKED state 204, the DSD performs a security status enquiry (in state 216) to ensure that the DSD is registered, in the SSR of the server application 170, as a secured device.

It will be appreciated that the functionality of the DSD 100 may be further defined by configuration parameters, or operational sub-states that, together with the operational states of the DSD, define the functionality of the DSD. For example, in the unlocked state, the DSD may be configured to provide limited, or modified access to the storage medium, such as read-only access, or access to a limited partition of the storage medium.

Security State Update Event

A security state update event 250 triggers the DSD to transmit a security status enquiry message to the server application 170, to enquiry as to the registered security status of the DSD as recorded in the SSR 172.

A security state update event may comprise one or more of: the DSD connecting to a wireless network; the DSD turning on from an off state; a user interface (e.g. a button or a switch) of the DSD being activated. In some embodiments, the DSD may be configured to transmit security status enquiry messages periodically. Accordingly, the security state update event may be triggered by an internal timer of the DSD.

Security Event

In response to a security event 210, the DSD is configured to transition from its current state to the UNSECURED state, in particular, the idle state 222. A security event 210 may comprise one or more of: the DSD experiencing a loss of power, including a depleted battery; the DSD experiencing a loss of wireless connectivity; the DSD experiencing a loss of wireless connectivity to the server application in particular; the DSD receiving a security status update message (e.g. message 430) from the server application, while the DSD is not in state 216.

Locked State

In some embodiments, in response to the DSD 100 being in the LOCKED state 202, the storage controller 110 locks the data path 104, such that the DSD does not action any read or write commands received from the host computer 130 via the data channel 150.

In some embodiments, when the DSD is in the LOCKED state, in response to receiving a media access command, such as a read command or a write command, from the host computer, via data channel 150, the DSD transmits a locked state indication to the host computer 130. In embodiments, the locked state indication may indicate, to the host computer, that the DSD is not ready to action any media access commands. In embodiments, the locked state indication may indicate, to the host computer, that there is not storage medium present in the DSD (e.g. MEDIUM NOT PRESENT, MEDIUM NOT FOUND).

In response to the DSD 100 being in the LOCKED state 202, the DSD may receive power via the power interface 105. In response to the power port 106 being connected to the host computer 130, the DSD may receive power from the host computer via the power interface.

Unlocked State

In response to the DSD 100 being in the UNLOCKED state 204, the storage controller actions media access commands received from a master device, such as the host computer 130, via the data channel 150 or the user device 140 via communication channel 145. In particular, when the DSD is in the UNLOCKED state 204, in response to receiving a read command from the host computer 130 via the data channel, the storage controller obtains the read data from the storage medium 108, and provides the read data to the host computer via the data channel 150. Similarly, when the DSD is in the unlocked state, in response to receiving a write command from the host computer via the data channel 150, the DSD receives the write data via the data channel and writes the write data to the storage medium.

In response to entering the UNLOCKED state, the DSD 100 registers, with the host computer system 130, as a block data storage device. For example, the DSD provides information, to the host computer, via the data port 180 in the form of a USB device descriptor. The USB device descriptor contains relevant information about the DSD. Accordingly, in embodiments in which the data storage device is connected to a host computer system via a USB connection, the data storage device registers with the host computer system as a block data storage device by configuring its USB device descriptor to indicate that the data storage device is a block data storage device.

The USB device descriptor provides structured information regarding the USB device such as the class of device, protocols supported, type of device, manufacturer and other configuration parameters. An operating system of a host computer can obtain the USB device descriptor of the data storage device by sending various standard control requests (e.g., GET_DESCRIPTOR requests) to the data storage device. In response to receiving these requests, the data storage device provides the USB_DEVICE_DESCRIPTOR to the host computer system, thus registering the data storage device with the host computer system as a block data storage device. The host computer interprets the USB_DEVICE_DESCRIPTOR to determine the configuration and capabilities of the data storage device. The host computer system may then store information regarding the data storage device in the registers of the operating system of the host computer system.

Configuring the SSR

Figure 3:
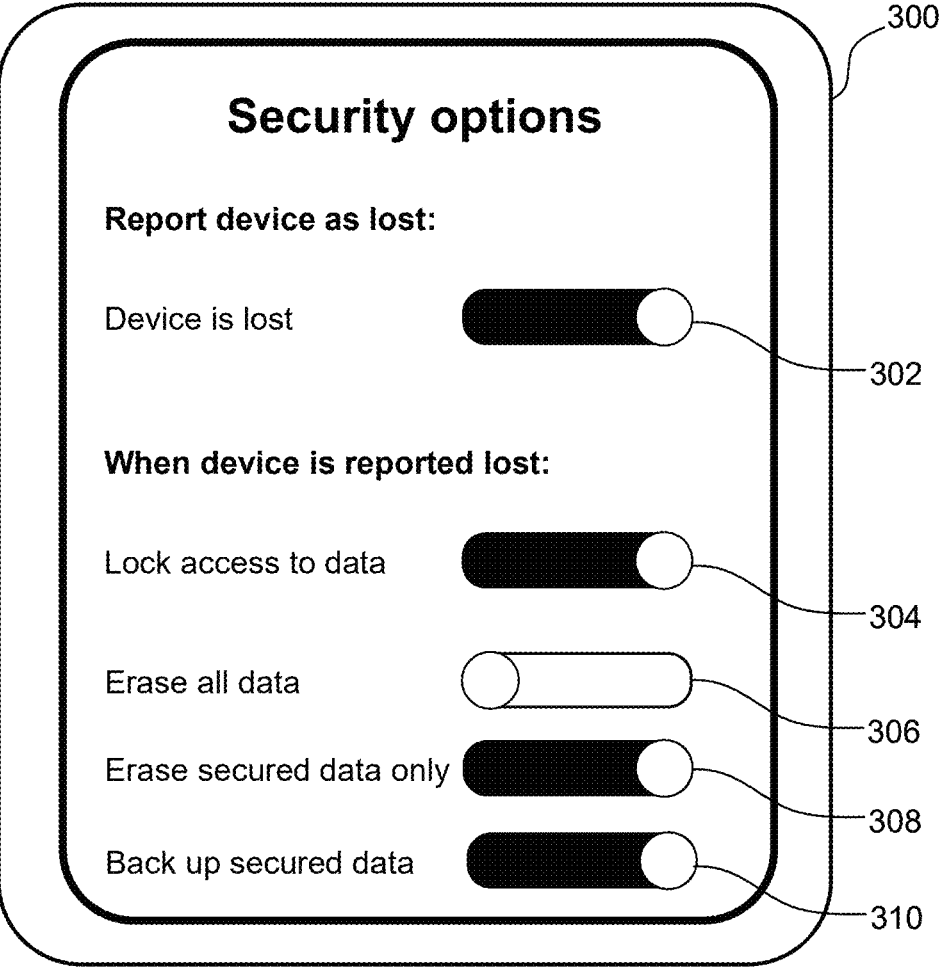
FIG. 3 illustrates part of a graphical user interface (GUI) for the user application, as displayed on the user device, in accordance with an embodiment.

FIG. 3 illustrates part of a graphical user interface (GUI) 300 for the user application 142, as displayed on the user device 140, in accordance with an embodiment. The GUI 300 provides a user 101 with a means to register the DSD 100 as being unsecured (e.g. lost, stolen, misplaced). Via the activation of GUI object 302, a user can signal that they consider that the DSD is unsecured.

Figure 4:
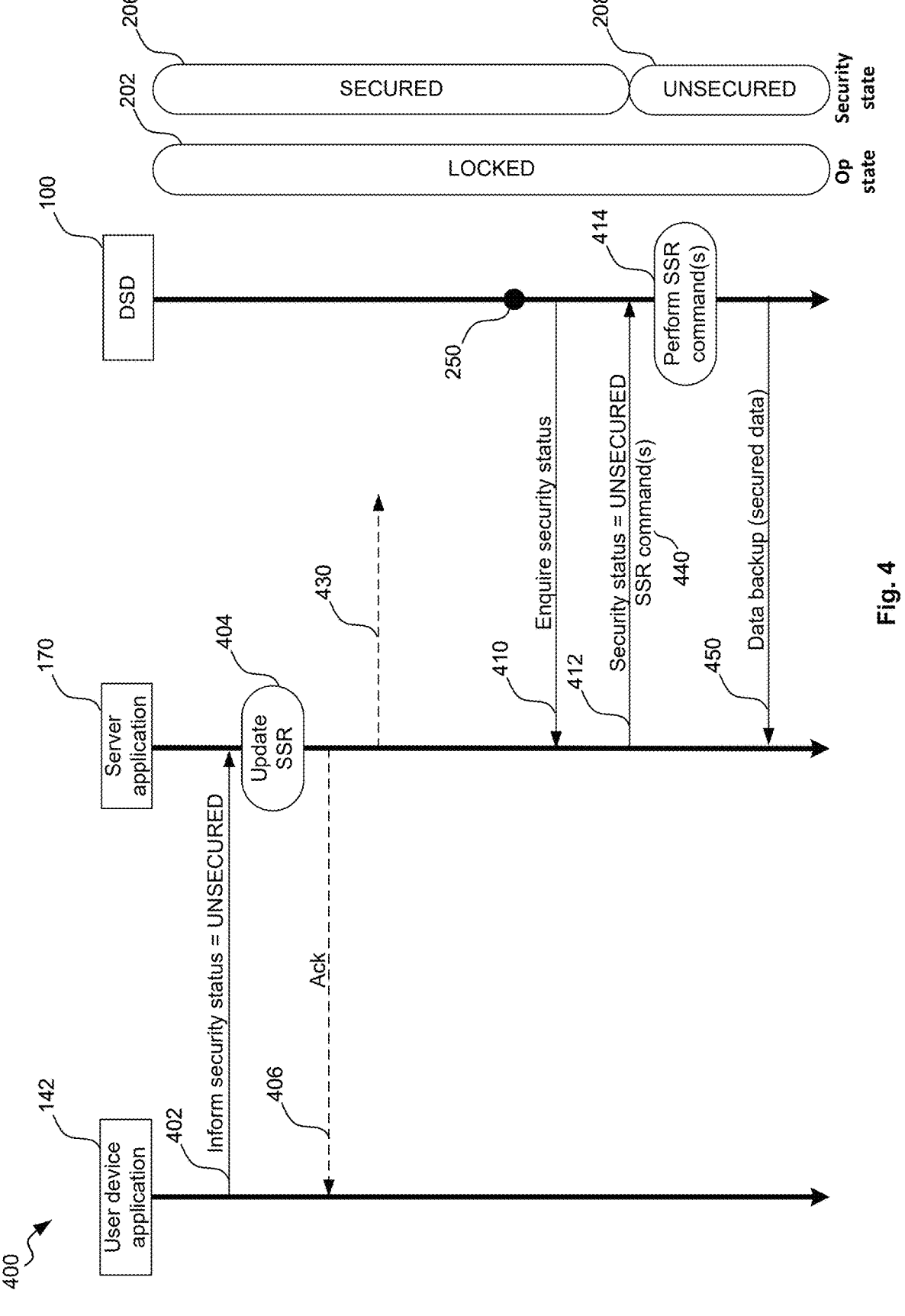
FIG. 4 illustrates a message sequence between the user device application, the server application and the DSD, in accordance with an embodiment.

FIG. 4 illustrates a message sequence between the user device application 142, the server application 170 and the DSD 100, in accordance with an embodiment. FIG. 4 illustrates messages transmitted in response to the user reporting that the DSD is unsecured.

In response to the activation of GUI object 302, the user application 142 transmits a message 406 to the server application 170, via Internet 160, reporting that the DSD is unsecured. In response to receiving message 406, the server application updates 404 the SSR 172 to indicate that the security state of the DSD is now 'unsecured'. In response to the server application updating the SSR, the server application may provide an acknowledgement message 406 to the user application.

The GUI 300 also provides a user 101 with a means to specify what actions the user would like the DSD to take in response to the DSD being notified that it is in an 'unsecured' state. For example, in accordance with the embodiment of FIG. 3, in response to the user activating GUI object 304, the user device transmits command information to the server application, wherein the command information commands the DSD to lock access to user data stored in the storage medium 108 in response to the DSD transitioning to the UNSECURED state 208. In some embodiments, the DSD may be configured to, by default, lock access to user data stored in the storage medium 108 in response to the DSD transitioning to the UNSECURED state 208.

In response to the user activating GUI object 306, the user device transmits command information to the server application, wherein the command information commands the DSD to erase all user data stored in the storage medium 108 in response to the DSD transitioning to the UNSECURED state 208. In the example shown in FIG. 3, GUI object 306 is not activated.

In response to the user activating GUI object 308, the user device transmits command information to the server application, wherein the command information commands the DSD to erase secured user data, as described further herein, from the storage medium 108 in response to the DSD transitioning to the UNSECURED state 208.

In response to the user activating GUI object 310, the user device transmits command information to the server application, wherein the command information commands the DSD to backup secured user data, as described further herein, to another device (e.g. the user device 140 or the server 170) in response to the DSD transitioning to the UNSECURED state 208.

In a preferred embodiment, the user configures the security commands in advance of the DSD becoming unsecured. However, in some embodiments, the user can configure the security commands, via the user device, at any time after the DSD is registered with the user's device.

Message Sequence

FIG. 4 illustrates a sequence of messages communicated between the user application 142 and the server application 170 (via internet 160), and a sequence of message communicated between the server application 170 and the DSD 100 (via internet 160), in accordance with an embodiment. Each messages illustrated in FIG. 4 may comprise a plurality of transmissions (e.g. packets). Furthermore, additional messages may be transmitted between the user application, the server application and the DSD that are not illustrated in FIG. 4.

In response to the user reporting the DSD as being unsecured, by activating GUI button 302, the user application 142 transmits message 402 to the server application 170. Message 402 comprises information indicating that the user reports that the DSD is unsecured.

In response to the server application 170 receiving message 402, the server application 170 updates 404 the security status field of the SSR associated with the DSD 100. In some embodiments, the server application may also provide an acknowledgement 406 of message 402 back to the device application.

In some embodiments, in response to the server application 170 receiving message 402, the server application 170 attempts to transmits a security status update message 430 to the DSD 100 via communication channel 195. The security status update message comprises an indication that the security status is 'unsecured', and may also comprise the security commands. In the event that the DSD does not have wireless connectivity to the internet 160, the security status update message 430 may not be received by the DSD.

Message 402 may also comprise security command information, as described further in relation to GUI 300. Responsive to the message 402 comprising security command information, the server application updates the security command fields of the SSR associated with the DSD 100.

In response to the occurrence of a security status update event 250, the DSD is configured to transmit a security status enquiry message 410 to the server application 170, via wireless communication channel 195. In response to receiving the security status enquiry message, the server application communicates the contents of the SSR 172 entry, associated with the DSD, to the DSD via security status update message 412. Security status update message comprises an indication of the registered security status of the DSD, which in this case is UNSECURED, and may include an indication of the SSR security commands 440.

In response to receiving the security status update message 412, the DSD performs actions 414 in accordance with the SSR security commands 440.

Erasing User Data

In an embodiment, the SSR security command 440 comprises an erase command, which instructs the DSD to erase user data stored in storage medium 108. Furthermore, the security command 440 comprises an indication of the user data to be erased from the storage medium. The user data to be erased from the storage medium is referred to as the secured user data. The secured user data may comprise one or more of: one or more data files stored in the storage medium; one or more data files in a folder stored in the storage medium; all the user data stored in a memory region of the storage medium; all user data stored in a partition of the storage medium; all user data stored in a logical unit number of the storage medium; and all user data stored in the storage medium.

In response to receiving message 412, which includes the erase command and indicates the secured user data, the DSD performs an erase operation 414 to erase the secured user data. The erase operation may comprise: overwriting the secured user data with pseudo random data or non-random data; or removing a reference to the secured user data.

Backup User Data

In an embodiment, the SSR security command 440 comprises a backup command, which instructs the DSD to transmit user data stored in storage medium 108 to a data sink device. Furthermore, the security command 440 comprises an indication of the user data to be backed up from the storage medium. The user data to be backed up from the storage medium is referred to as the secured user data. The secured user data may comprise one or more of: one or more data files stored in the storage medium; one or more data files in a folder stored in the storage medium; all the user data stored in a memory region of the storage medium; all user data stored in a partition of the storage medium; all user data stored in a logical unit number of the storage medium; and all user data stored in the storage medium.

In response to receiving message 412, which includes the backup command and indicates the secured user data, the DSD performs a backup operation 414 to transmit 450 the secured user data to a data sink. In some embodiments, the data sink is indicated in configuration memory 112. In some embodiments, the data sink is indicated in message 412. In some embodiments, the data sink comprises server application 170 and the backup operation 414 comprises transmitting the secured user data to the server application via communication channels 195, 160 and 192.

In some embodiments, the data sink comprises user device 140 and the backup operation 414 comprises transmitting the secured user data to the user device via communication channel 145. In some embodiments, the data sink comprises host computer system 130 and the backup operation 414 comprises transmitting the secured user data to the host computer system via communication channel 150.

For security reasons, the DSD may be configured to transmit the secured user data to the data sink as encrypted user data.

In some embodiments, the SSR security command 440 comprises an erase command as well as a backup command. In such an embodiment, the DSD is configured to backup the secured user data by transmitting the secured user data to the defined data sink, then the DSD is configured to erase the secured user data from the storage medium.

Determining Wireless Connection

In some embodiments, the DSD comprises a web-enabled device that is configured to determine a wireless connection to the security server application 170. The DSD may initiate a Transmission Control Protocol (TCP) handshake with the server application 170. The handshake may involve a three-way communication including: the DSD transmitting a synchronize packet to the server application, indicating its intention to establish a connection; the server application responding with a synchronize-acknowledge packet acknowledging the request and indicating readiness to proceed; and the DSD transmitting an acknowledge packet back to the server application, confirming the connection establishment.

Once the TCP connection is established between the DSD 100 and the server application 170, data can flow between the DSD and the server. The server application may maintain a session for the DSD, associating the DSD with a unique session ID. The session ID enables subsequent requests from the same DSD to be handled without re-establishing the TCP connection. In some embodiments, the security controller 122 of the DSD may comprise a web security module configured to apply an additional layer of security to communications between the DSD and the server application. The device and server application may negotiate a secure connection using Transport Layer Security (TLS).

In response to the DSD determining a wireless connection to the server application via internet 160, the DSD may transmit a security status enquiry message 210 to the server application 170.

Secure Unlocking Process

Unless securely unlocked by an authorized user device, the DSD 100 remains in the LOCKED state 202. To transition the DSD out of the LOCKED state 202, into the UNLOCKED state 204, the user application 142 is configured to perform, in conjunction with the security controller 122 of the DSD 100, a secure unlocking process 212.

Figure 5:
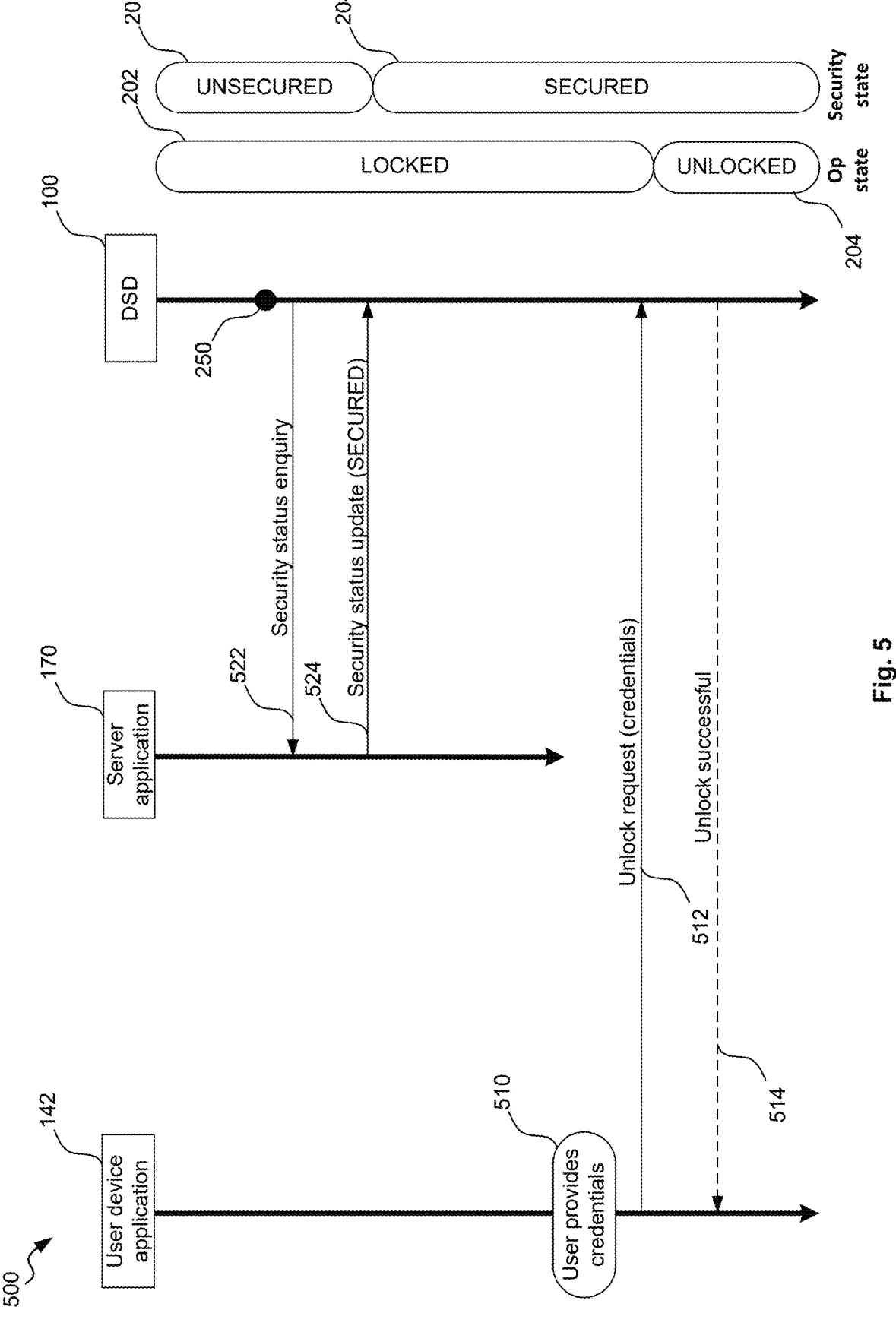
FIG. 5 illustrates a message sequence between the user application and the DSD, in accordance with an embodiment.

FIG. 5 illustrates a message sequence 500 between the user application 140 and the DSD 100, in accordance with an embodiment. The messages communicated between the user application and the DSD are transmitted via the communication channel 145. The messages illustrated in FIG. 5 may represent a plurality of transmissions over the communication channel. Furthermore, additional messages may be transmitted between the user device application 142 and the DSD that are not illustrated in FIG. 5.

In response to user 101 providing credentials (e.g. password, passcode, key) to the user device application, the user device application transmits an unlock request message 512 to the DSD over wireless communication channel 145.

In response to receiving the unlock request message, the security controller 122 is configured to perform the secure unlocking process 212.

As described further herein, the secure unlocking process can provide the user device with data transfer access to the storage medium of the DSD 100 via communication channel 145. Alternatively, or additionally, the secure unlocking process can provide the host computer 130 with data transfer access to the storage medium of the DSD 100 via the data channel 150.

The secure unlocking process 212 may comprise verifying the user's authorization to access the storage medium of the DSD. An example secure unlocking process is described in U.S. patent application Ser. No. 16/706,780 which is incorporated herein by reference.

In embodiments, the secure unlocking process 212 comprises: the user application 142 receiving, from the security controller 122, a cryptographic challenge; the user application determining a response to the cryptographic challenge and transmitting the response to the security controller over the wireless communication channel 145; and the security controller verifying the validity of the response.

Notably, the security controller 122 sends the challenge to the user device 140 over a communication channel that is different from the data channel to the host computer system. For example, the data channel may include a wire-based USB connection while the communication channel between the security controller 122 and the user device 140 is a wireless (e.g., Bluetooth) connection.

In response to the security controller 122 being able to verify the authorization of the user device, the secure unlocking process completes successfully. In some embodiments, through the secure unlocking process, the security controller can determine the cryptographic key by which the cryptographic engine can decrypt the encrypted data stored in the storage medium.

In response to successfully completing the unlocking process 212, the DSD may transmit a successful acknowledgement message 514 to the user device application.

Security Status Enquiry

FIG. 5 further illustrates the DSD 100 transmitting a security status enquiry message 522 in response to a security state update event 250. In response to receiving the security status enquiry message, the server application 170 transmits a security status update message 524 to the DSD 100, over the Internet 160.

In the example illustrated in FIG. 5, the security status update message 524 indicates that the DSD is registered, in the SSR 172, as being 'secured'. In response to the security status update message indicating that the DSD is registered as being 'secured', the DSD transitions from the UNSECURED state 208 to the SECURED state 206. Advantageously, the DSD remains in the LOCKED state 202 until the secure unlocking process has been successfully completed.

Security Event

Figure 6:
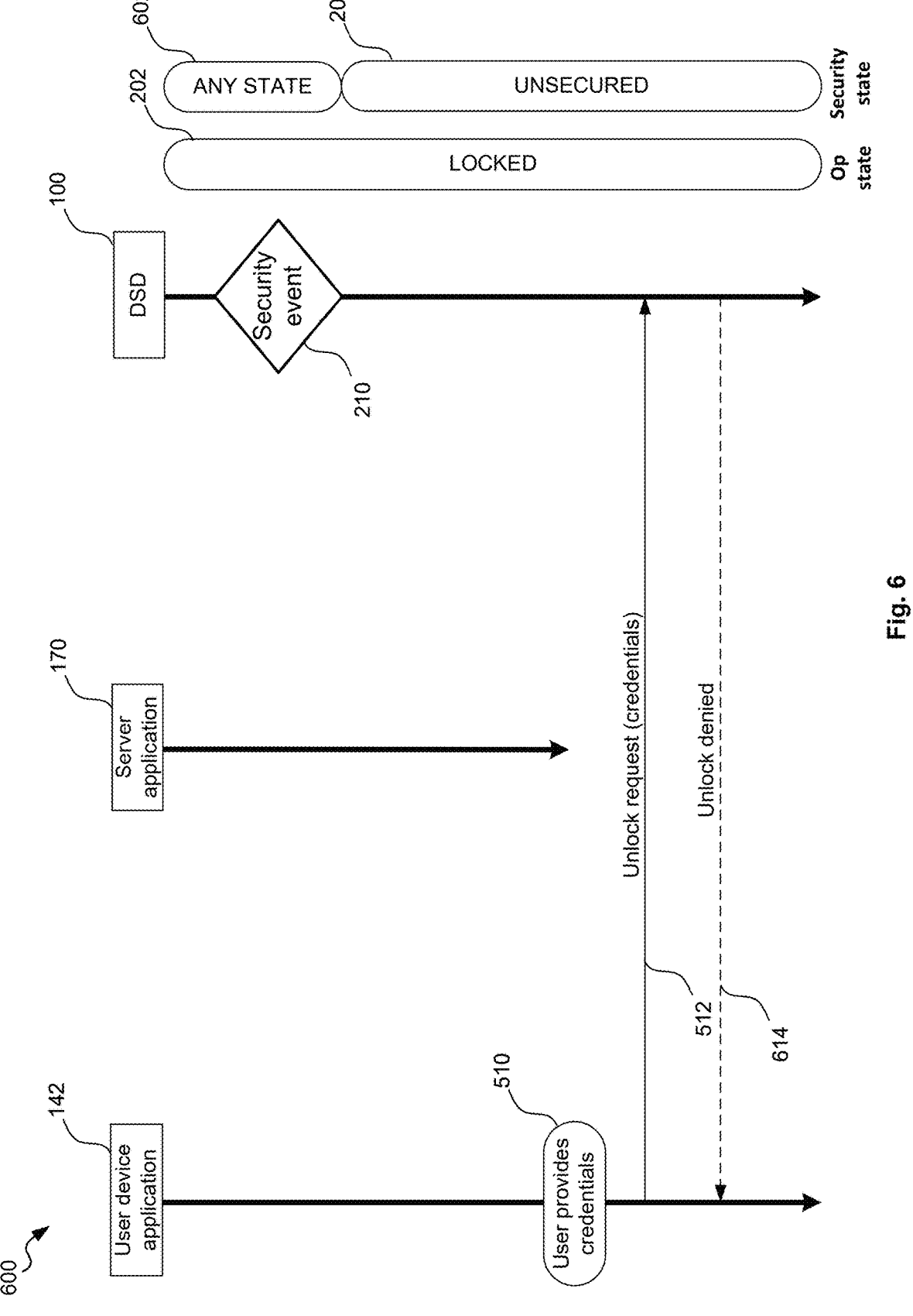
FIG. 6 illustrates a message sequence between the user application and the DSD, in accordance with an embodiment.

FIG. 6 illustrates a message sequence 600 between the user application 140 and the DSD 100, in accordance with an embodiment. The messages communicated between the user application and the DSD are transmitted via the communication channel 145. The messages illustrated in FIG. 6 may represent a plurality of transmissions over the communication channel. Furthermore, additional messages may be transmitted between the user device application 142 and the DSD that are not illustrated in FIG. 6.

As per message sequence 500 in FIG. 5, in response to user 101 providing credentials (e.g. password, passcode, key) to the user device application, the user device application transmits an unlock request message 512 to the DSD over wireless communication channel 145.

At the time of receiving the unlock request message 512, the DSD is in the UNSECURED state 208. Accordingly, in response to receiving the unlock request message, the DSD does not perform the secure unlocking process 212. Rather, the DSD remains in the LOCKED state 202. In some embodiments, in response to receiving an unlock request message while the DSD in the UNSECURED state, the DSD transmits an unlock denied message 614 to the user device application.

FIG. 5 further illustrates the DSD 100 transitioning to the UNSECURED state 208 in response to the occurrence of a security event 210. In some embodiments, the DSD is configured to transition to the UNSECURED state 208 from any 602 operational state of the DSD in response to the occurrence of a security event 210.

Graphical User Interface

Figure 7:
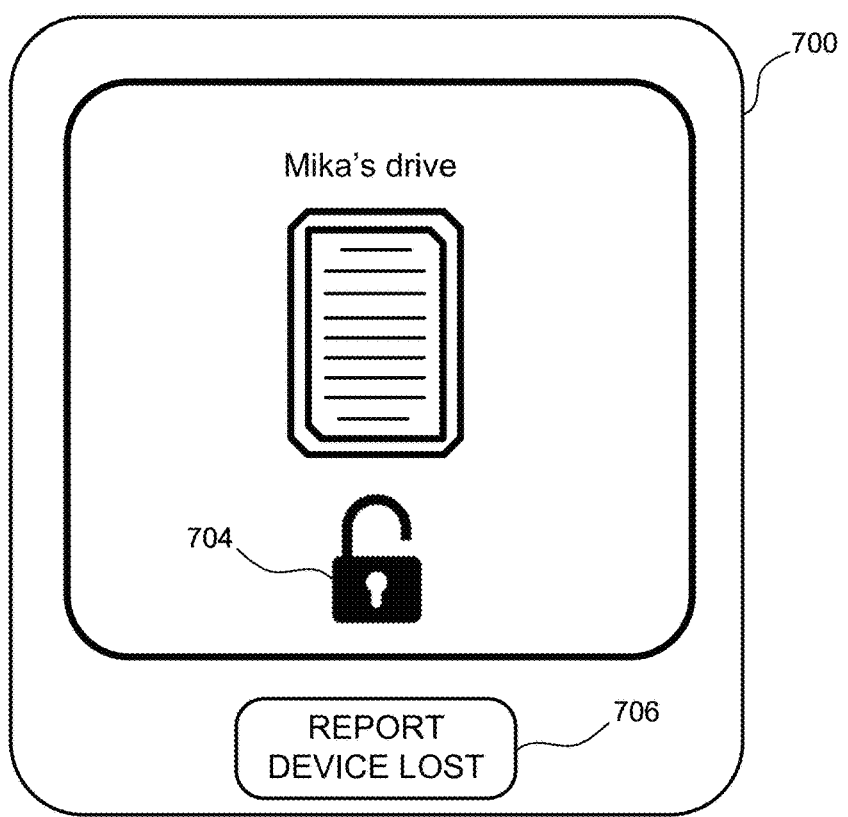
FIG. 7 illustrates a GUI of the user device application, in accordance with an embodiment.

FIG. 7 illustrates a GUI 700 of the user device application 142, in accordance with an embodiment. GUI 700 provides an indication, to the user, of the operational state of the DSD 100. In particular, the GUI indicates, via icon 704, that the DSD 100 is in the UNLOCKED state 204, and has been made accessible for data transfers to and from the storage medium 108.

GUI 700 also provides the user with the means in which to control the operational state of the DSD 100. In particular, the user has the option of activating button 706 to report the DSD as being unsecured (e.g. lost, stolen).

Figure 8:
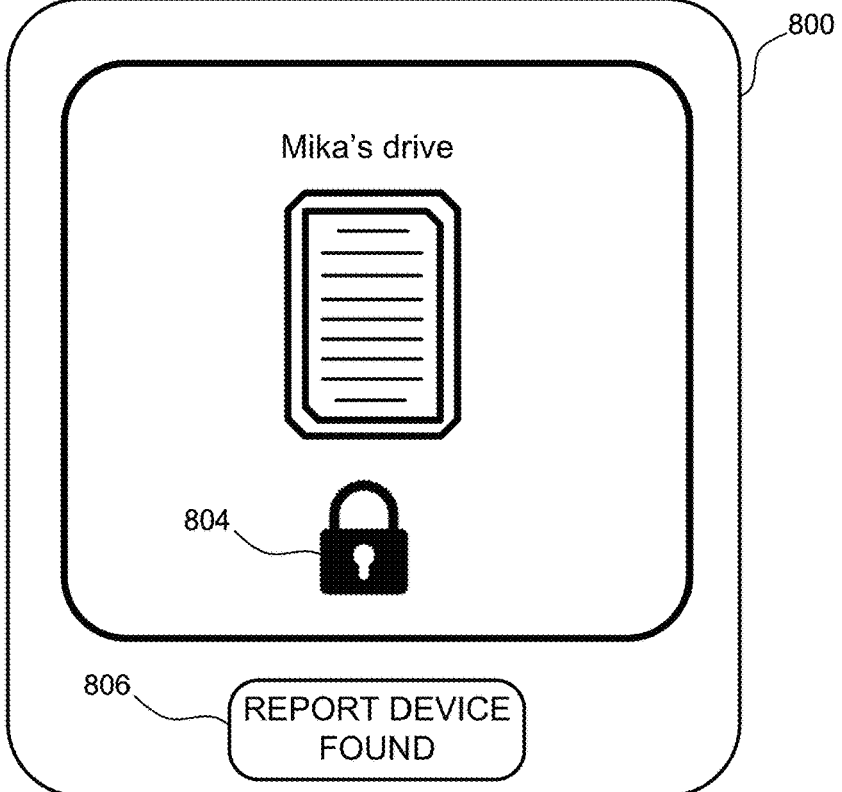
FIG. 8 illustrates another GUI of the user device application, in accordance with an embodiment.

FIG. 8 illustrates a GUI 800 of the user device application 142, in accordance with an embodiment. GUI 800 provides an indication, to the user, of the operational state of the DSD 100. In particular, the GUI indicates, via icon 804, that the DSD 100 is in the LOCKED state 202, and has been made accessible for data transfers to and from the storage medium 108.

GUI 800 also provides the user with the means in which to control the operational state of the DSD 100. In particular, the user has the option of activating button 806 to report the DSD as being secured (e.g. found).

Passwords

References to a 'password' as used herein refer generally to information which may be provided by a user to authenticate the user. Accordingly, a password may comprise: a personal identification number (PIN); a passphrase; a passcode comprising alphanumeric symbols and other symbols; or biometric information associated with the user; or any combination thereof.

It will be appreciated by persons skilled in the art that numerous variations and/or modifications may be made to the above-described embodiments, without departing from the broad general scope of the present disclosure. Furthermore, it will be appreciated by persons skilled in the art that embodiments disclosed herein can be combined with one or more other embodiment disclosed herein, without departing from the broad general scope of the present disclosure. The present embodiments are, therefore, to be considered in all respects as illustrative and not restrictive.

It will be appreciated by persons skilled in the art that any suitable distribution of functionality between different functional units may be used without detracting from the invention. For example, functionality illustrated to be performed by separate computing devices may be performed by the same computing device. Likewise, functionality illustrated to be performed by a single computing device may be distributed amongst several computing devices. Hence, references to specific functional units are only to be seen as references to suitable means for providing the described functionality, rather than indicative of a strict logical or physical structure or organization.

It will be appreciated by persons skilled in the art that, for processes and methods disclosed herein, the operations performed in the processes and methods may be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

References herein to software or executable instructions are to be understood as referring to executable instructions stored in volatile or non-volatile memory. The memory can include any data storage device that can store data which can thereafter be read by a processor. Examples of memory include read-only memory (ROM), random-access memory (RAM), magnetic tape, optical data storage device, flash storage devices, or any other suitable storage devices.

Throughout this specification the word 'comprise', or variations such as 'comprises' or 'comprising', will be understood to imply the inclusion of a stated element, integer or step, or group of elements, integers or steps, but not the exclusion of any other element, integer or step, or group of elements, integers or steps.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A data storage device comprising:
   a data port configured to transceive data between a data source and the data storage device;
   a non-volatile storage medium configured to store secured data received from the data source;
   a wireless communication port, configured to wirelessly communicate between a server and the data storage device, wherein:
      the data storage device is configured to maintain an operational status of the data storage device selected from at least locked and unlocked; and
      a server application running on the server is configured to:
         maintain a security status of the data storage device selected from secured and unsecured; and
         change, responsive to a message from a user application, the security status from secured to unsecured; and
   one or more processors, individually or in combination, configured to, in response to the operational status of the data storage device being locked:
      transmit, via the wireless communication port, a security status enquiry message to the server;
      receive, via the wireless communication port and from the server, the security status of the data storage device;
      receive, from the user application, an unlock request comprising verified user credentials;
      in response to the security status indicating that the data storage device is secured, transition the operational status of the data storage device from locked to unlocked; and
      in response to the security status indicating that the data storage device is unsecured, maintaining the operational status of the data storage device as locked.

2. The data storage device of claim 1, wherein:
   the user application is configured to run on a user device that is not the data storage device or the server; and
   the server application is further configured to maintain the security status independent of the operational status of the data storage device.

3. The data storage device of claim 1, wherein receiving, from the server, the security status comprises receiving one or more security commands indicating actions to be taken by the data storage device in response to the security status indicating that the data storage device is unsecured.

4. The data storage device of claim 3, wherein:

the one or more security commands comprises an erase command; and in response to receiving the erase command, the one or more processors, individually or in combination, are further configured to erase the secured data from the non-volatile storage medium.

5. The data storage device of claim 4, wherein the erase command comprises an indication of the secured data.

6. The data storage device of claim 4, wherein the secured data comprises one or more of:

one or more data files stored in the non-volatile storage medium;

one or more data files in a folder stored in the non-volatile storage medium;

all user data stored in a partition of the non-volatile storage medium;

all user data stored in a logical unit number of the non-volatile storage medium; and all user data stored in the non-volatile storage medium.

7. The data storage device of claim 1, wherein:

receiving, from the server, the security status comprises receiving one or more security commands indicating actions to be taken by the data storage device in response to the security status indicating that the data storage device is unsecured;

the one or more security commands comprises a backup command; and in response to receiving the backup command, the one or more processors, individually or in combination, are further configured to transmit, via the wireless communication port, the secured data stored in the non-volatile storage medium.

8. The data storage device of claim 7, wherein the backup command comprises an indication of the secured data.

9. The data storage device of claim 7, wherein the secured data comprises one or more of:

one or more data files stored in the non-volatile storage medium;

one or more data files in a folder stored in the non-volatile storage medium;

all user data stored in a partition of the non-volatile storage medium;

all user data stored in a logical unit number of the non-volatile storage medium; and all user data stored in the non-volatile storage medium.

10. The data storage device of claim 7, wherein the secured data is transmitted as encrypted data.

11. The data storage device of claim 1, wherein transmitting, via the wireless communication port, the security status enquiry message to the server is responsive to a security status update event.

12. The data storage device of claim 11, wherein the security state update event comprises one or more of:

the data storage device connecting to a wireless network;

the data storage device turning on from an off state;

an interface of the data storage device being activated; and a trigger of an internal timer of the data storage device.

13. The data storage device of claim 1, wherein the one or more processors, individually or in combination, are further configured to, in response to an occurrence of a security event, transition the operational status of the data storage device to locked.

14. The data storage device of claim 13, wherein the security event comprises one or more of:

the data storage device experiencing a loss of power;

the data storage device experiencing a depleted battery;

the data storage device experiencing a loss of wireless connectivity on the wireless communication port;

the data storage device experiencing a loss of wireless connectivity to the server; and the data storage device receiving a security status update message from the server.

15. The data storage device of claim 1, wherein transmitting a security status enquiry message comprises establishing a wireless communication between the data storage device and the server.

16. The data storage device of claim 1, wherein, in response to the operational status of the data storage device being unlocked, the one or more processors, individually or in combination, are further configured to:

receive, via the data port, user data; and write the user data to the non-volatile storage medium as secured data.

17. The data storage device of claim 1, wherein, in response to the operational status of the data storage device being unlocked, the one or more processors, individually or in combination, are further configured to receive, via the data port, a request to read the secured data stored in the non-volatile storage medium; and transmit, via the data port, the secured data.

18. The data storage device of claim 1, wherein, in response to the operational status of the data storage device being locked and receiving, via the data port, a read request or a write request, the one or more processors, individually or in combination, are further configured to transmit an error message via the data port.

19. A method for unlocking a data storage device comprising:

maintaining, by the data storage device, an operational status of the data storage device selected from at least locked and unlocked;

maintaining, by a server application running on a server, a security status of the data storage device selected from secured and unsecured;

changing, responsive to a message from a user application, the security status from secured to unsecured;

transceiving, through a data port of the data storage device, data between a data source and the data storage device;

storing, to a non-volatile storage medium of the data storage device, secured data received from the data source;

wirelessly communicating, through a wireless communication port of the data storage device, between the server and the data storage device; and in response to the operational status of the data storage device being locked:

transmitting, via the wireless communication port, a security status enquiry message to the server;

receiving, via the wireless communication port, from the server, the security status of the data storage device;

receiving, from the user application, an unlock request comprising verified user credentials;

in response to the security status indicating that the data storage device is secured, transitioning the operational status of the data storage device from locked to unlocked; and in response to the security status indicating that the data storage device is unsecured, maintaining the operational status of the data storage device as locked.

20. A data storage device comprising:

a data port configured to transceive data between a data source and the data storage device;

a non-volatile storage medium configured to store secured data received from the data source;

a wireless communication port, configured to wirelessly communicate between a server and the data storage device, wherein:

the data storage device is configured to maintain an operational status of the data storage device selected from at least locked and unlocked; and a server application running on the server is configured to:

maintain a security status of the data storage device selected from secured and unsecured; and change, responsive to a message from a user application, the security status from secured to unsecured;

means to transmit a security status enquiry message to the server;

means to receive from the server the security status of the data storage device;

means to receive, from the user application, an unlock request comprising verified user credentials;

means to, in response to the security status indicating that the data storage device is secured, transition the operational status of the data storage device from locked to unlocked; and means to, in response to the security status indicating that the data storage device is unsecured, maintaining the operational status of the data storage device as locked.

\* \* \* \* \*